C. P. HENRY & F. H. SHAW.
MACHINE FOR FORMING CORRUGATED CURTAIN ROD HEADS.
APPLICATION FILED OCT. 23, 1911.
1,034,796.
Patented Aug. 6, 1912.
2 SHEETS—SHEET 1.
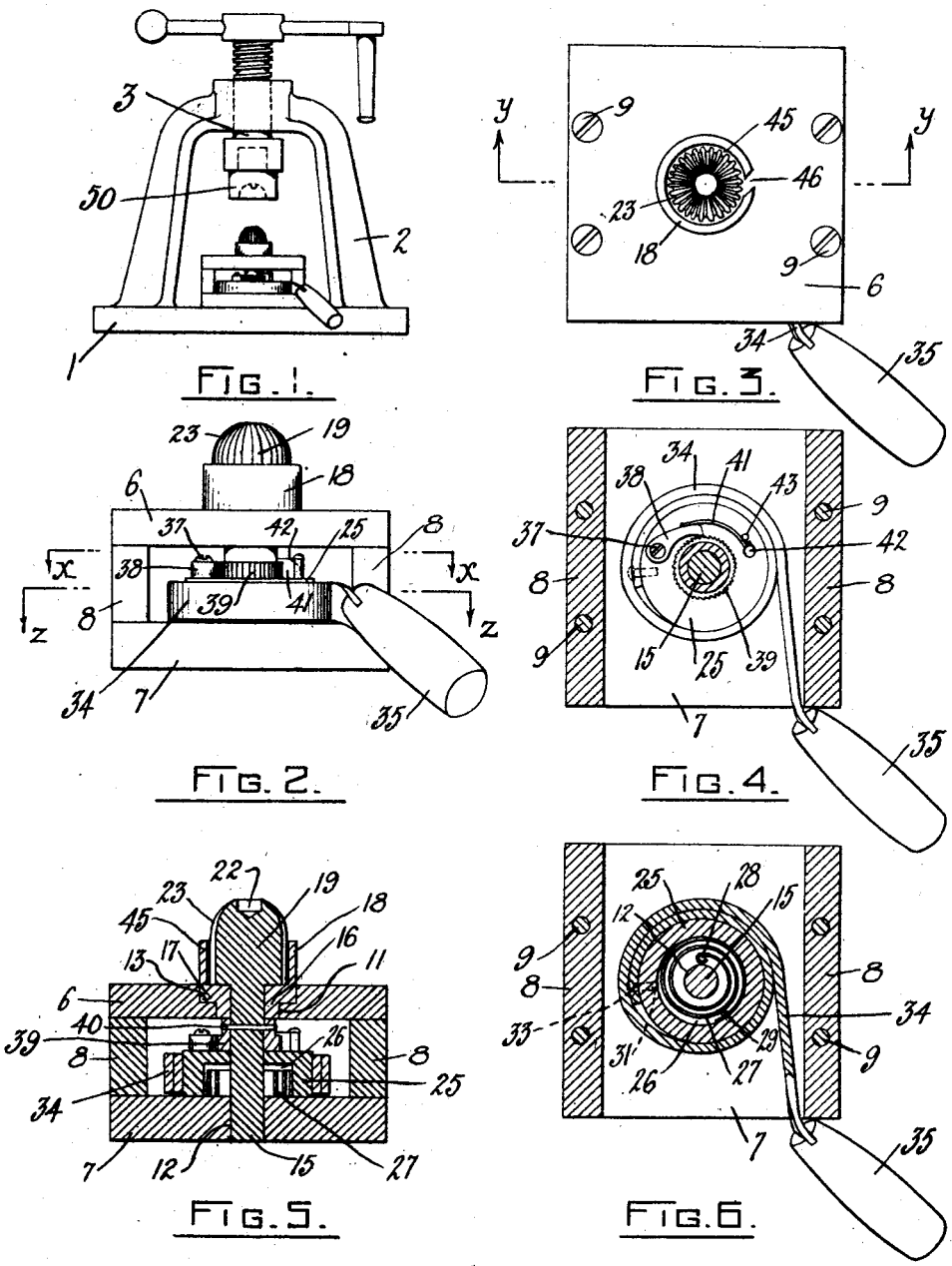
WITNESSES.
Albert G. Purzynthowski
Charles D. Kinsley
INVENTORS.
Charles P. Henry and
Frank H. Shaw by
Horatio E. Bellows
ATTORNEY.

C. P. HENRY & F. H. SHAW.
MACHINE FOR FORMING CORRUGATED CURTAIN ROD HEADS.
APPLICATION FILED OCT. 23, 1911.

1,034,796.

Patented Aug. 6, 1912.
2 SHEETS—SHEET 2.

WITNESSES.

INVENTORS.
Charles P. Henry and
Frank H. Shaw by
Horatio E. Bellows
ATTORNEY.

UNITED STATES PATENT OFFICE.

CHARLES P. HENRY AND FRANK H. SHAW, OF PROVIDENCE, RHODE ISLAND, ASSIGNORS TO C. P. HENRY NOVELTY COMPANY, A CORPORATION OF RHODE ISLAND.

MACHINE FOR FORMING CORRUGATED CURTAIN-ROD HEADS.

1,034,796.   Specification of Letters Patent.   Patented Aug. 6, 1912.

Application filed October 23, 1911. Serial No. 656,084.

*To all whom it may concern:*

Be it known that we, CHARLES P. HENRY and FRANK H. SHAW, both citizens of the United States, residing at Providence, in the county of Providence and State of Rhode Island, have invented certain new and useful Improvements in Machines for Forming Corrugated Curtain-Rod Heads, of which the following is a specification.
Our invention relates to a machine or device intended to form the heads of curtain rods. These heads have corrugated peripheries and are in final form spherical or otherwise curved.
The essential objects of our invention are to provide a mechanism which shall close down the stock into heads without flattening the corrugations and without causing an over-lapping of the corrugations or ribs at their points of convergence; to automatically feed the stock to the former; to insure against excessive wear upon any part of the forming tool or anvil; to increase the speed of the forming operation; and to decrease the cost of manufacture.

Figure 7:
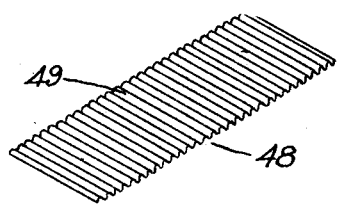
Figure 8:
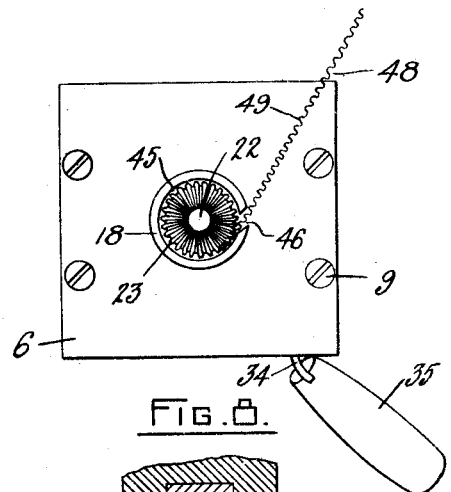
Figure 9:
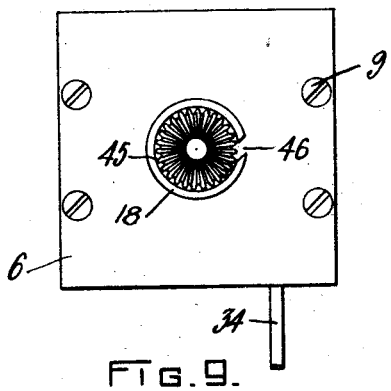
Figure 10:
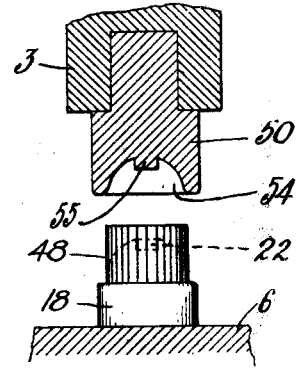
Figure 12:
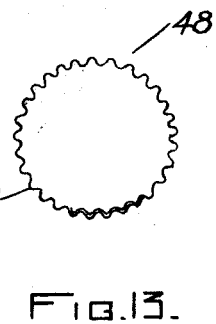

To the above ends essentially our invention consists in such parts and in such combinations of parts as fall within the scope of the appended claims.
In the accompanying drawings which form a part of this specification, Figure 1 is a front elevation of the head of a press equipped with our novel mechanism; Figs. 2 and 3, front and plan elevations respectively of our mechanism; Figs. 4, 5, and 6, sections respectively on line *x—x* of Fig. 2, *y—y* of Fig. 3, and *z—z* of Fig. 2. Fig. 7, a perspective view of the blank to be operated upon, Fig. 8, a plan of our machine showing the blank at the time of its insertion, Fig. 9, a like view of the same showing the blank wound upon the forming tool, Figs. 10 and 11, side elevations, with parts partially broken away, of the operative parts before and during the forming action respectively, Fig. 12, a side elevation of the stock after the forming operation, and Fig. 13, an end view of the same.

Like reference characters indicate like parts throughout the views.

Our forming mechanism is in the present instance shown mounted in a press which is typical of any kind of die operating mechanism.

1 is the base, 2 the head or yoke, and 3 the plunger or screw of a press.

Our forming mechanism comprises a suitable frame, consisting in this instance, of a top plate 6, bottom plate 7, and plates 8 intermediate the ends of the top and bottom plates and affixed thereto by screws 9 or otherwise. Openings 11 and 12 in the plates 6 and 7 respectively are in alinement with each other, and in the opening 11 is an annular shoulder 13. Rotatable in the opening 12 is a shaft 15 integral with or fixed to an intermediate portion of which is a collar 16 rotatable in the opening 11 and provided with a shoulder 17 resting upon the shoulder 13. The collar has an upwardly directed annular flange 18 upon its outer margin. The upper face of the collar abuts against the bottom of an anvil 19 of cylindrical form throughout the area inclosed by the flange 18, but having a rounded or hemispherical end portion extending above the flange. The outer extremity of the anvil is provided with a recess 22, and the side and upper end portion of the anvil is provided with a series of longitudinally disposed ribs 23 extending parallel with each other along the side of the anvil and converging gradually along the rounded portion of the latter.

A collar 25 provided with a central orifice 26 is loose on the shaft 15 and slidably rests upon the plate 7. In the orifice 26 is a volute spring 27 surrounding the shaft 15 fixed at one end to a pin 28 in the plate 7 and at its other end to a pin 29 in the collar. In a threaded opening 31 in the side of the collar 25 is a screw 33 engaging the end of a strap 34 coiled around the collar and to whose end is attached a handle 35.

Pivoted to a pin 37 in the upper part of the collar 25 is a pawl 38 engaging a ratchet wheel 39 fixed by a pin 40 to the shaft 15. The pawl is pressed into engagement with the ratchet by a spring 41 having one end fixed to a pin 42 in the top face of the collar, and resting against a stop pin 43 also in the collar.

It will be observed that by manually pulling the handle 35 and unwinding the strap 34 against the resistance of the spring 27 the anvil 19 is through the pawl and ratchet wheel rotated to any desired extent.

Figure 13:
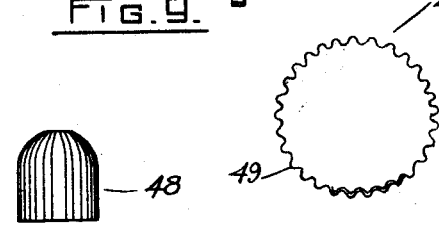
Figure 11:
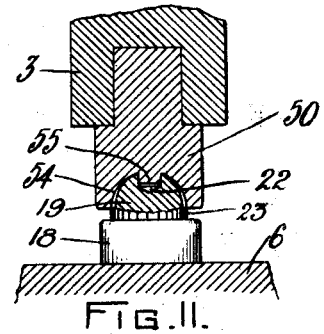

It will be observed that there is an annular space 45 between the anvil 19 and the flange 18. This flange is also provided with a vertical slot 46 disposed tangentially with relation to the side of the anvil 19. The purpose of this slot is to receive and guide to the anvil 19 the blank 48 which is manually inserted therethrough to the face of the anvil. The blank 48, shown in detail in Fig. 7, is an oblong strip of thin metal provided with a continuous transverse series of corrugations 49 corresponding in dimensions and relative location with the ribs 23 upon the anvil 19. Therefore when the forward end of the blank has been fed into contact with the periphery of the anvil, and the handle 35 has begun to be pulled the ribs on the anvil, which register in the corrugations of the blank, carry the latter through the space 45 until the rear end of the blank overlaps its front end, as shown in Fig. 13. The described parts are now in the position shown in Fig. 10, so that when the coöperating female or closing down die is applied in a vertical direction, either manually or otherwise, the guiding and forming character of the ribs 23 upon the former 19 will insure regular unlapped converging corrugations upon the resultant curtain rod head. In the present instance the member employed to close down the blank is a die 50 mounted in any convenient manner in the plunger 3, and provided with a concavity 54 in its bottom and a central projection 55, the latter being adapted when the plunger descends, as shown in Fig. 11, to enter the cavity 22 in the top of the anvil 19.

What we claim is,—

1. In a device for forming corrugated heads, the combination with the frame, of a shaft rotatably mounted in the frame, an anvil upon the shaft provided with a series of ribs, a collar upon the shaft, a spring connecting the collar and the frame, and a member attached to the collar and adapted to rotate the same.

2. In a device for forming corrugated heads, the combination with the frame, of a shaft rotatably mounted in the frame, an anvil upon the shaft provided with a series of ribs, a collar upon the shaft, a spring connecting the collar and the frame, and a flexible member fixed at one end to the collar and coiled around the same.

3. In a device for forming corrugated heads, the combination with the frame, of a shaft rotatably mounted in the frame, an anvil upon the shaft provided with a series of ribs, a collar upon the shaft, a spring connecting the collar and the frame, a ratchet upon the shaft, a pawl upon the collar engaging the ratchet, and a member engaging the collar adapted to rotate the shaft.

4. In a device for forming corrugated heads, the combination with the frame, of a shaft rotatably mounted in the frame, an anvil upon the shaft provided with a series of ribs, a collar upon the shaft, a spring connecting the collar and the frame, a ratchet upon the shaft, a pawl upon the collar engaging the ratchet, a spring upon the collar pressing against the pawl, and a flexible member attached to the collar and coiled around the collar.

5. In a device for forming corrugated heads, the combination with the frame, of an anvil provided with a series of longitudinally disposed converging ribs rotatably mounted in the frame, a collar at the base of the anvil, a flange upon the collar surrounding the anvil and interspaced therefrom and provided with a guide slot, and means for rotating the anvil.

6. In a device for forming corrugated heads, the combination with the frame, of a shaft rotatably mounted in the frame, an anvil upon the end of the shaft comprising a cylindrical body and a curved end portion, a collar upon the shaft at the base of the anvil, a flange upon the collar surrounding the anvil and provided with a guide slot, a second collar upon the shaft, a flexible member attached to the second collar and coiled around it to impart rotary movement to the shaft, and spring means for rotating the shaft in an opposite direction.

7. In a device for forming corrugated heads, the combination with the frame, of a shaft rotatably mounted in the frame, an anvil upon the shaft provided with a series of ribs, a collar loose on the shaft, a ratchet wheel fast on the shaft, operative connections between the collar and the ratchet wheel, a spring connecting the collar and the frame, and a flexible member coiled upon the collar.

In testimony whereof we have affixed our signatures in presence of two witnesses.

CHARLES P. HENRY.
FRANK H. SHAW.

Witnesses:
HORATIO E. BELLOWS,
CHARLES D. KENNEY.